United States Patent [19]
Dougherty

[11] Patent Number: 5,629,739
[45] Date of Patent: May 13, 1997

[54] APPARATUS AND METHOD FOR INJECTING AN ANCILLARY SIGNAL INTO A LOW ENERGY DENSITY PORTION OF A COLOR TELEVISION FREQUENCY SPECTRUM

[75] Inventor: Robert A. Dougherty, Ozona, Fla.

[73] Assignee: A.C. Nielsen Company, Schaumburg, Ill.

[21] Appl. No.: 399,187

[22] Filed: Mar. 6, 1995

[51] Int. Cl.$^6$ ............................................. H04N 7/081
[52] U.S. Cl. ...................... 348/486; 348/1; 348/473
[58] Field of Search ............................ 348/1, 473, 486, 348/4; H04N 7/081

[56] References Cited

U.S. PATENT DOCUMENTS

| | | | |
|---|---|---|---|
| 2,982,813 | 5/1961 | Hathaway | 178/5.6 |
| 3,838,444 | 9/1974 | Loughlin et al. | 178/5.2 |
| 3,842,196 | 10/1974 | Loughlin | 358/12 |
| 3,924,060 | 12/1975 | Bedford | 348/486 |
| 4,025,851 | 5/1977 | Haselwood et al. | 325/31 |
| 4,647,974 | 3/1987 | Butler et al. | 348/473 |
| 5,404,161 | 4/1995 | Douglas et al. | 348/1 |

FOREIGN PATENT DOCUMENTS

WO94/10799  5/1994  WIPO ........................ H04N 7/00

*Primary Examiner*—Victor R. Kostak
*Attorney, Agent, or Firm*—Marshall, O'Toole, Gerstein, Murray & Borun

[57] ABSTRACT

An ancillary signal is injected into a program signal within the frequency band normally occupied by the program signal alone. The program signal includes a modulated carrier having a carrier frequency and a low energy density portion of the frequency band. The ancillary signal is selectively added at an injection frequency within the lower energy density portion of the frequency band so that the injection frequency is locked to the carrier frequency and to the frequency of a local oscillator.

52 Claims, 1 Drawing Sheet

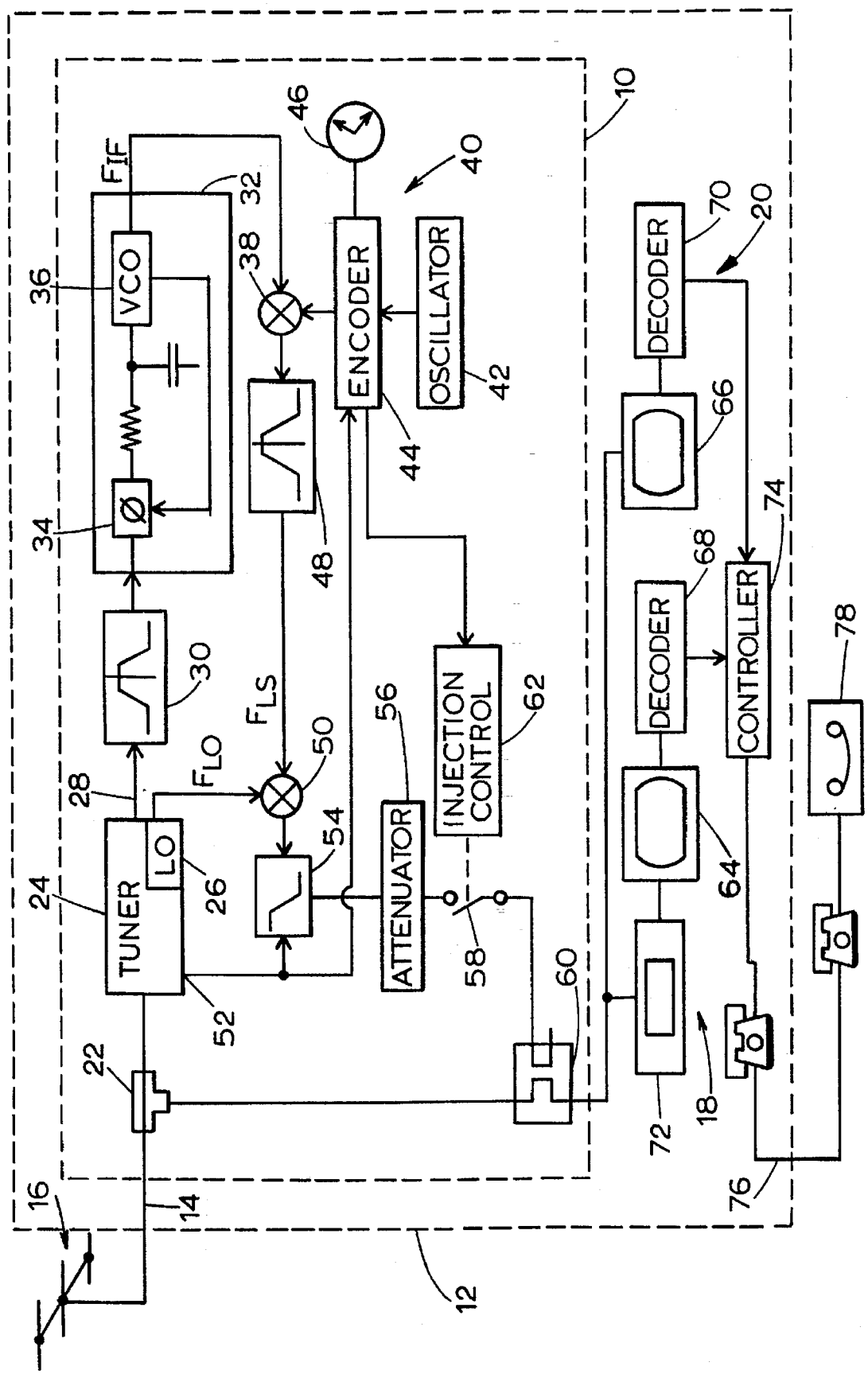

APPARATUS AND METHOD FOR INJECTING AN ANCILLARY SIGNAL INTO A LOW ENERGY DENSITY PORTION OF A COLOR TELEVISION FREQUENCY SPECTRUM

TECHNICAL FIELD OF THE INVENTION

The present invention relates to a system and a method for compatibly transmitting and receiving both a program signal and an ancillary signal within the frequency band normally occupied by the program signal alone and, more particularly, to a system and method for compatibly transmitting and receiving both a color television program signal and an ancillary signal so that the ancillary signal is added to a low energy density portion of the color television program signal.

BACKGROUND OF THE INVENTION

It is known to add ancillary signals to radio frequency signals in order either to monitor the broadcasts of programs or to measure audiences of programs. Such programs may include television programs, radio programs, and/or the like, and the broadcast of such programs may include the transmission of these programs over the air, over a cable, via a satellite, and/or the like.

When monitoring the broadcast of programs, a monitoring system typically determines the identity of the programs which were broadcast, the regions in which these programs were broadcast, the times at which these programs were broadcast, and the channels over which these programs were broadcast. One monitoring system, which is commonly used within the United States, is referred to as the "AMOL" system and is taught by Haselwood, et al. in U.S. Pat. No. 4,025,851. This "AMOL" system adds a source identification code to selected horizontal lines on the vertical blanking intervals of the program signal. Monitoring equipment, which is located in selected regions throughout the United States, determines the identity of the programs which are broadcast by detecting the source identification codes of the broadcast programs. The monitoring equipment stores, for later retrieval, these detected source identification codes together with the times at which these source identification codes were detected and the channels on which these source identification codes were detected.

When measuring the audiences of programs, an audience measurement system typically determines which programs were viewed by which members of a statistically sampled panel of dwellings. One type of an audience measurement system uses an ancillary signal to monitor a program receiver, and commonly injects this ancillary signal (which may be a simple tone, or a complex digital code) into a channel that may be carrying a viewed program. The ancillary signal is injected by an apparatus which is located at or near the program receiver being monitored. The detection of such an ancillary signal provides an indication that the program receiver is on and is tuned to the channel carrying the detected ancillary signal. Signal injection systems are taught, inter alia, in PCT/US93/09458 by Mostafa, et al.

Adding an ancillary signal to a program signal must generally be done so as to minimize the probability that the ancillary signal will interfere with any aspect of the basic program signal. Several systems are known which add ancillary signals at selected frequencies within the radio frequency band, or channel, of a program signal. For example, in U.S. Pat. No. 2,982,813, Hathaway teaches a system which frequency interleaves the ancillary and program signals. In U.S. Pat. No. 3,838,444, Loughlin, et al. teach a system which compatibly adds and transmits an ancillary signal in a low energy density portion of a color television frequency spectrum. The low energy density portion of interest is located between the video carrier and the color subcarrier of the NTSC television signal, and is at a frequency which is about 2.4 MHz above the video carrier peak in the radio frequency band of the NTSC television signal. The teachings of Loughlin, et al. in U.S. Pat. No. 3,838,444 are herein incorporated by reference.

Furthermore, in U.S. Pat. No. 3,842,196, Loughlin discloses an improved system which minimizes interference between a primary ancillary signal and the program signal by adding a redundant ancillary signal. The redundant ancillary signal is transmitted with an inverted polarity as compared to the primary ancillary signal so that artifacts which may be caused by the addition of an ancillary signal to the program signal are canceled in the video display.

However, the accuracy with which these systems set the absolute frequency of the ancillary signal which is to be injected into the program signal is limited. For example, a reasonable error (e.g., ±50 KHz) in setting the frequency (e.g., 100 MHz) of the ancillary signal can cause the injected ancillary signal to overlap a harmonic of the horizontal scanning frequency. If the frequency of the ancillary signal, because of an error, overlaps a harmonic of the horizontal scanning frequency, the ancillary signal will interfere with the program signal. This interference is annoyingly apparent to a viewer. Moreover, if the frequency of the ancillary signal is uncertain, a monitoring system or an audience measurement system may have difficulty in picking up and using the ancillary signal for program monitoring and/or audience measurement purposes.

The present invention overcomes one or more of these problems

SUMMARY OF THE INVENTION

Therefore, according to one aspect of the present invention, a method for compatibly transmitting and receiving both a program signal and an ancillary signal within a frequency band normally occupied by the program signal alone, wherein the program signal includes a modulated carrier having a carrier frequency and a low energy density portion of the frequency band, comprises the steps of (i) receiving the program signal, and (ii) selectively adding the ancillary signal at an injection frequency within the lower energy density portion of the frequency band so that the injection frequency is locked to the carrier frequency.

According to another aspect of the present invention, a system compatibly transmits and receives both a program signal and an ancillary signal within a frequency band normally occupied by the program signal alone. The program signal includes a modulated carrier having a carrier frequency and a low energy density portion of the frequency band. The system comprises a receiver and a signal injector. The receiver is arranged to receive the program signal, and the receiver has a local oscillator which produces a local oscillator frequency. The signal injector is arranged to selectively add the ancillary signal at an injection frequency within the lower energy density portion of the frequency band so that the injection frequency is locked to the local oscillator frequency.

According to still another aspect of the present invention, a system compatibly transmits and receives a television program signal and an RF ancillary signal. The television program signal is in a predetermined RF frequency band, and the television program signal has a modulated video carrier signal and a low energy density portion of the frequency band. The system comprises a tuner, first and second mixers, and a coupler. The tuner is arranged to receive the television program signal and has as outputs a local oscillator signal and a modulated carrier signal. The first mixer is arranged to mix an injection signal at a predetermined baseband injection frequency with a signal representative of the modulated carrier signal to produce an intermediate frequency injection signal. The second mixer is arranged to mix the local oscillator signal with the intermediate frequency injection signal to produce the RF ancillary signal. The coupler is arranged to couple the RF ancillary signal into the received television program signal.

According to yet another aspect of the present invention, a method of injecting an RF ancillary signal into a low energy density portion of a channel normally occupied by a color television program signal, wherein the color television program signal has a modulated video carrier, a chrominance subcarrier, and the low energy density portion, comprises the steps of (i) tuning the color television program signal so as to produce a local oscillator signal and a modulated carrier signal as outputs, (ii) mixing an injection signal at a predetermined injection frequency with a signal representative of the modulated carrier signal to produce an output injection signal, (iii) mixing the local oscillator signal with the output injection signal to produce the RF ancillary signal, and (iv) coupling the RF ancillary signal into the color television program signal.

According to a further aspect of the present invention, a broadcast tuning measurement method in which an RF ancillary channel recognition signal is added to a television program signal received at a predetermined channel frequency within a sampled dwelling unit, wherein the RF ancillary channel recognition signal is subsequently read from the television program signal at a viewing site, comprises the steps of (i) tuning the television program signal so as to produce a local oscillator frequency and a video carrier signal as outputs, (ii) providing an injection signal at a predetermined frequency which is selected to be in a low energy density part of a channel, (iii) combining the video carrier signal with the injection signal to form a carrier/injector signal, (iv) combining the local oscillator frequency with the carrier/injection signal to form the RF ancillary channel recognition signal, and (v) coupling the RF ancillary channel recognition signal into the television program signal.

DESCRIPTION OF THE DRAWING

These and other features and advantages will become apparent from a detailed consideration of the present invention when taken in conjunction with the single FIGURE of the drawing which is a schematic block diagram of a signal injection apparatus of the present invention.

DETAILED DESCRIPTION

A receiving and encoding apparatus 10 is located within a selected dwelling 12 at or near a signal entrance 14 at which television signals from a signal source 16 enter the selected dwelling 12. The receiving and encoding apparatus 10 encodes all television signals on all channels receivable from the signal source 16. In the specific embodiment of the present invention shown in FIG. 1, the source of program signals, i.e. the signal source 16, is shown as an antenna. However, the signal source 16 may alternatively be a satellite dish, a cable, and/or the like. Moreover, although only one source of program signals, i.e., the signal source 16, is shown, additional sources may supply program signals to the selected dwelling 12. If so, either a single receiving and encoding apparatus 10 may encode all television signals on all channels from all sources or, preferably, a receiving and encoding apparatus 10, which encodes all television signatures on all channels of a corresponding source, may be provided for each source. Other variations are, of course, possible.

If sources of program signals are provided for the selected dwelling 12 in addition to the signal source 16, and if each such source has its own corresponding receiving and encoding apparatus 10, each such receiving and encoding apparatus 10 should preferably be located or near the service entrance through which its corresponding program signal source enters the selected dwelling 12. Because each receiving and encoding apparatus 10 is located at or near the service entrance through which the television signals receivable from a corresponding source of program signals enter the selected dwelling 12, each receiving and encoding apparatus 10 may be easily arranged to encode only the television signals on the channels receivable from its corresponding source of program signals. Accordingly, if all such sources of program signals are encoded at their respective signal entrances, the source of programs to which a receiver within the selected dwelling 12 is tuned may be more readily identified.

The selected dwelling 12 may contain a first viewing site 18. Additionally, the selected dwelling 12 may contain a second viewing site 20. More or fewer viewing sites may be contained within the selected dwelling 12 as is desirable. It will be understood that, although the embodiment of the invention shown in the drawing includes various known elements of the television audience measurement art, the method and apparatus of the present invention are more broadly directed to any system in which the addition of an ancillary signal to a program signal is advantageous.

The receiving and encoding apparatus 10 is connected to the signal source 16 of television program signals by way of a splitter 22, for example. A tuner 24 is connected to an output of the splitter 22. The tuner 24 periodically and sequentially tunes to each of the television channel frequencies available from the signal source 16. The tuner 24 includes a local oscillator 26 and has an output 28. As is well known in the tuner art, the tuner 24 mixes the frequency of the signal provided by the local oscillator 26 with the television channel frequencies, which are available from the signal source 16 and which are selected by the tuner 24, in order to down convert the selected television channel frequency to an intermediate frequency. The signal having this intermediate frequency is provided by the tuner 24 on the output 28.

In the receiving and encoding apparatus 10, the signal on the output 28 of the tuner 24 is applied to a video carrier bandpass filter 30 which is centered on the intermediate frequency of the video carrier (e.g., which is 45.75 MHz in a conventional NTSC receiver). The video carrier bandpass filter 30 is selected to pass the intermediate frequency of the video carrier, to reject the other intermediate frequencies, and to have a passband which is wide enough to accept the worst case off-frequency error in the intermediate frequency of the video carrier which is expected to be encountered (e.g., a 100 KHz luminance frequency error on a locally-originated cable channel). The video carrier bandpass filter 30 provides the intermediate frequency video carrier to a video carrier reconstruction circuit 32.

The video carrier reconstruction circuit 32 includes a phase detector 34 and a voltage controlled oscillator 36. The video carrier reconstruction circuit 32 phase locks the voltage controlled oscillator 36 to the video carrier reference signal from the video carrier bandpass filter 30 in order to generate an unmodulated, reconstructed video carrier signal which has a frequency $F_{IF}$ and which is applied to a first input of a code-adding balanced mixer 38. Thus, the video carrier reconstruction circuit 32 selects from the output of the video carrier bandpass filter 30 only the frequency of the intermediate frequency video carrier and excludes all other frequencies which may pass through the video carrier bandpass filter 30. Also, because the unmodulated, reconstructed video carrier signal having the frequency $F_{IF}$ is derived from the frequency of the local oscillator 26 and from the frequency of the modulated video carrier of the television channel selected by the tuner 24, any shift in the frequency of the local oscillator 26 or in the video carrier frequency selected by the tuner 24 leads to a corresponding shift in the frequency of the unmodulated, reconstructed video carrier signal having the frequency $F_{IF}$ provided by the video carrier reconstruction circuit 32 to the code-adding balanced mixer 38. Thus, as will be subsequently discussed in greater detail, the apparatus of the present invention locks the frequency at which the ancillary signal is injected to both the received video carrier frequency of the television channel currently selected by the tuner 24 and to the frequency of the signal provided by the local oscillator 26 in order to ensure that the ancillary signal is indeed injected into the desired lower energy density portion of the selected television channel.

An injection signal circuit 40 supplies an injection signal, which has a frequency $F_{IJ}$, to a second input of the code-adding balanced mixer 38. The injection signal circuit 40 includes an oscillator 42 and an encoder 44. The frequency of the oscillator 42 may be, for example, 2.399475 MHz, which is the 305th harmonic of one-half of the horizontal scan rate in an NTSC television signal, and the encoder 44 may be any known encoder capable of modulating the oscillator 42. (It should be noted here that, when the frequency of about 2.399475 MHz is added to the frequency of a video carrier, the resulting frequency is within the low energy density portion of the color television program signal.) A time-stamped code may be added to the output of the oscillator 42 and, if so, may be derived from a clock 46. Alternatively, a title code, a channel number code, a source code, or the like, or no code. may be added instead of the time-stamped code. The code-adding balanced mixer 38 mixes the unmodulated, reconstructed video carrier signal having the frequency $F_{IF}$ with the injection signal having the frequency $F_{IJ}$ in order to produce first and second intermediate frequency encoded ancillary output signals having corresponding sum and difference frequencies $F_{IF}+F_{IJ}$ and $F_{IF}-F_{IJ}$.

The first and second intermediate frequency encoded ancillary output signals having the corresponding sum and difference frequencies $F_{IF}+F_{IJ}$ and $F_{IF}-F_{IJ}$ are applied to a sideband stripping filter 48. For an example of the frequencies which may be used by the receiving and encoding apparatus 10, the frequency $F_{IF}$ of the unmodulated, reconstructed video carrier signal produced by the video carrier reconstruction circuit 32 will be 45.75 MHz, if the original input signal is exactly on frequency and if the local oscillator 26 frequency is exactly 45.75 MHz above the input signal frequency. Thus, if the oscillator 42 is set at 2.399475 MHz, the frequency of the first intermediate frequency encoded ancillary output signal of the code-adding balanced mixer 38 is about 48.149475 MHz and the frequency $F_{LS}$ of the second intermediate frequency encoded ancillary output signal of the code-adding balanced mixer 38 is about 43.350525 MHz.

The sideband stripping filter 48 is preferably a bandpass filter centered on the frequency $F_{LS}$ of the second intermediate frequency encoded ancillary output signal of the code-adding balanced mixer 38. The frequency $F_{LS}$ of the second intermediate frequency encoded ancillary output signal is the lower sideband frequency of the intermediate frequency encoded ancillary output signals produced by the code-adding balanced mixer 38. Moreover, the sideband stripping filter 48 preferably has a passband width sufficient to pass a worst case off-frequency error which, for example, may be ±100 KHz. The sideband stripping filter 48 necessarily has a narrow enough passband to reject the first intermediate frequency encoded ancillary output signal of the code-adding balanced mixer 38. The frequency of the first intermediate frequency encoded ancillary output signal is the higher sideband frequency of the intermediate frequency encoded ancillary output signals produced by the code-adding balanced mixer 38.

The second intermediate frequency encoded ancillary output signal of the code-adding balanced mixer 38, which is filtered by the sideband stripping filter 48 and which has the frequency $F_{LS}$, is applied to a first input of a balanced up converting mixer 50. The signal provided by the local oscillator 26, which has a frequency $F_{LO}$, is available as an output from the tuner 24 and is applied to a second input of the balanced up converting mixer 50. The balanced up converting mixer 50 mixes the second intermediate frequency encoded ancillary output signal, which is filtered by the sideband stripping filter 48 and which has the frequency $F_{LS}$, and the output signal of the local oscillator 26, which has the frequency $F_{LO}$. Accordingly, the balanced up converting mixer 50 produces first and second intermediate frequency tracking signals having corresponding sum and difference frequencies $F_{LS}+F_{LO}$ and $F_{LS}-F_{LO}$.

Continuing the NTSC example discussed above, if the tuner 24 is tuned to VHF channel 3 (i.e., 61.25 MHz) so that the local oscillator 26 produces a frequency $F_{LO}$ of 107 MHz, the first and second intermediate frequency tracking signals have corresponding sum and difference frequencies $F_{LS}+F_{LO}$ and $F_{LS}-F_{LO}$ of about 150.350525 MHz and about 63.649475 MHz. The second intermediate frequency tracking signal having the difference frequency $F_{LS}-F_{LO}$ of about 63.649475 MHz is the desired tracking injection frequency for the selected VHF channel 3. (It should be noted that the difference between the video carrier frequency of 61.25 MHz for channel 3 and the frequency of about 63.649475 MHz is about 2.399475 MHz, which is the frequency of the output of the oscillator 42.)

The tuner 24 preferably has a channel-select output 52 (e.g., a control voltage which is applied to a varactor). The output of the balanced up converting mixer 50 is preferably filtered by a lowpass tracking filter 54 which is controlled by the channel-select output 52 from the tuner 24 to pass signals at frequencies no more than five to ten MHz greater than the video carrier frequency of the selected television channel. Therefore, the second intermediate frequency tracking signal, which has the difference frequency $F_{LS}-F_{LO}$ (i.e., the ancillary signal) and which is received from the balanced up converting mixer 50, is passed through the lowpass tracking filter 54, and then through a controllable attenuation circuit 56 and through a control switch 58 to a directional coupler 60. The control switch 58 is controlled by an injection controller 62 in order to inject the ancillary signal at controllable times with reference to the television broadcast signal. For example, the ancillary signal may be injected during the active video time of line twenty-four in the NTSC television signal and suppressed at all other times. The directional coupler 60 injects the ancillary signal into the television broadcast signal from the splitter 22 for distribution to the first and second viewing sites 18 and 20. The first intermediate frequency tracking signal having the sum frequency $F_{LS}+F_{LO}$, on the other hand, is blocked by the lowpass tracking filter 54. Also, the channel-select output 52 of the tuner 24 is connected to the encoder 44 permitting the encoder 44 to add a channel identifier to the injection signal which is supplied by the injection signal circuit 40 to the second input of the code-adding balanced mixer 38.

Accordingly, because the ancillary signal which is supplied to the directional coupler 60 is locked to the output signal of the local oscillator 26 and to the unmodulated, reconstructed video carrier signal which has the frequency $F_{IF}$, the ancillary signal tracks errors and offsets in both the frequency $F_{LO}$ of the signal provided by the local oscillator 26 and in the received video carrier. Also, because the amplitude of the ancillary signal will generally be far higher than that of the received television signal, the controllable attenuation circuit 56 is preferably employed between the lowpass tracking filter 54 and the directional coupler 60. The signal attenuation introduced by the controllable attenuation circuit 56, which may be controllable by known means, ensures that the amplitude of the ancillary signal which is injected by the directional coupler 60 is matched to the amplitude of the corresponding received television broadcast signal.

The first and second viewing sites 18 and 20 within the selected dwelling 12 may include, for example, corresponding television receivers 64 and 66 and corresponding decoders 68 and 70. In addition, the first viewing site 18 within the selected dwelling 12 may include, for example, a VCR 72. As is known in the audience measurement art, the ancillary signal is read by the decoder 68 from a video signal which is acquired by either the television receiver 64 or the VCR 72 at the first viewing site 18 within the selected dwelling 12, and the ancillary signal is read by the decoder 70 from a video signal which is acquired by the television receiver 66 at the second viewing site 20 within the selected dwelling 12.

The ancillary signal may be a channel-recognition signal comprising a record which may contain the time of initial reception at the signal entrance 14 (e.g., as may be generated by the clock 46 operatively associated with the injection signal circuit 40), a datum (e.g., a serial number of the receiving and encoding apparatus 10 as may be added by the encoder 44) which uniquely identifies the signal source 16 that was coded, and a datum indicative of the channel on which the encoded television signal in question was received (as may be also added by the encoder 44 in response to the channel-select output 52). This record, which may be time-stamped by the appropriate decoder 68 or 70 at the time of viewing, is stored by a local controller 74 and is subsequently forwarded via the public switched telephone network 76 to a central data collection office computer 78, as is known in the art. As is also known in the art, having two time stamps on a viewing record allows both the time of recording and the time of viewing of programs recorded in the selected dwelling 12 on the VCR 72 to be identified.

Some modifications and alterations of the present invention have been described above. Other modifications and alterations of the present invention will occur to those skilled in the art. For example, although the receiving and encoding apparatus 10 is shown located within the selected dwelling 12, the receiving and encoding apparatus 10 may be located at any location in which it is convenient to inject an ancillary signal into a program signal. Also, although the ancillary signal is specifically shown in the drawing as being injected into a television program signal, it should be apparent that the ancillary signal may be injected into any program signal such as a radio program signal. It will be understood by those skilled in the art that the teachings of the present invention, although described in connection with NTSC television signals, may be equally well applied to other broadcast television program signals (such as PAL and SECAM) and may be used with different conventional intermediate frequencies to determine corresponding selected frequencies. Also, although the drawing shows a single lowpass filter for the lowpass tracking filter 54, it will be understood by those skilled in the art that, in order to cover the approximately 800 MHz frequency range in which television program signals may be broadcast, a parallel array of lowpass tracking filters 54 may be used. Accordingly, it is intended that all such modifications and alterations be considered as within the spirit and scope of the invention as defined in the attached claims.

I claim:

1. A method for compatibly transmitting and receiving both a program signal and an ancillary signal within a frequency band normally occupied by the program signal alone, the program signal including a modulated carrier having a carrier frequency and a low energy density portion of the frequency band, the method comprising the following steps:

receiving the program signal; and, selectively adding the ancillary signal at an injection frequency within the lower energy density portion of the frequency band so that the injection frequency is locked to the carrier frequency.

2. The method of claim 1 wherein the step of selectively adding the ancillary signal comprises the step of selectively adding the ancillary signal at an injection frequency within the lower energy density portion of the frequency band so that the injection frequency is also locked to the frequency of a local oscillator.

3. The method of claim 1 wherein the step of selectively adding the ancillary signal comprises the step of modulating the ancillary signal on the carrier so that the injection frequency is locked to the carrier frequency.

4. A system for compatibly transmitting and receiving both a program signal and an ancillary signal within a frequency band normally occupied by the program signal alone, the program signal including a modulated carrier having a carrier frequency and a low energy density portion of the frequency band, the system comprising:

a receiver which is arranged to receive the program signal, wherein the receiver has a local oscillator producing a local oscillator frequency; and, a signal injector which is arranged to selectively add the ancillary signal at an injection frequency within the lower energy density portion of the frequency band so that the injection frequency is locked to the local oscillator frequency.

5. The system of claim 4 wherein the signal injector is arranged to selectively add the ancillary signal at an injection frequency within the lower energy density portion of the frequency band so that the injection frequency is also locked to the carrier frequency.

6. The system of claim 4 wherein the signal injector comprises a mixer which is arranged to mix the injection frequency with the carrier frequency so that the injection frequency is locked to the local oscillator frequency.

7. A system for compatibly transmitting and receiving a television program signal and an RF ancillary signal, wherein the television program signal is in a predetermined RF frequency band, and wherein the television program signal has a modulated video carrier signal and a low energy density portion of the frequency band, the system comprising:

a tuner arranged to receive the television program signal, the tuner having as outputs a local oscillator signal and a modulated carrier signal;

a first mixer arranged to mix an injection signal at a predetermined baseband injection frequency with a signal representative of the modulated carrier signal to produce an intermediate frequency injection signal;

a second mixer arranged to mix the local oscillator signal with the intermediate frequency injection signal to produce the RF ancillary signal; and, a coupler arranged to couple the RF ancillary signal into the received television program signal.

8. The system of claim 5 wherein the first mixer comprises:

a video carrier reconstruction circuit having the modulated carrier signal as an input and having an unmodulated, reconstructed video carrier signal as an output; and, a code-adding mixer arranged to mix an injection signal at a predetermined baseband injection frequency with the unmodulated, reconstructed video carrier signal to produce the intermediate frequency injection signal.

9. The system of claim 8 wherein the video carrier reconstruction circuit comprises a video carrier filter, wherein the video carrier filter is arranged to receive the modulated carrier signal as an input and to produce a modulated video carrier signal as an output.

10. The system of claim 9 wherein the code-adding mixer comprises a sideband-stripping filter selectively passing a lower sideband frequency component of the intermediate frequency injection signal produced by the code-adding mixer and not passing an upper sideband frequency component thereof.

11. The system of claim 10 wherein the code-adding mixer further comprises an encoder being arranged to modulate the intermediate frequency injection signal with a digital code, the digital code including a time datum.

12. The system of claim 10 wherein the code-adding mixer further comprises an encoder being arranged to modulate the intermediate frequency injection signal with a digital code, the digital code including time and channel data.

13. The system of claim 6 wherein the tuner has a channel-select signal as an output, and wherein the second mixer comprises:

an up converting mixer arranged to mix the local oscillator signal with the intermediate frequency injection signal to produce an ancillary signal; and, an output filter tunable in response to the channel select signal, wherein the output filter has the ancillary signal as an input and produces as an output the RF ancillary signal at a frequency which is equal to the algebraic difference between a frequency of the local oscillator signal and a frequency of the intermediate frequency injection signal.

14. The system of claim 13 wherein the RF ancillary signal has an amplitude, wherein the received television program signal has an amplitude, and wherein the output filter comprises an attenuator arranged to match the amplitude of the RF ancillary signal to the amplitude of the received television program signal.

15. The system of claim 13 wherein the video carrier reconstruction circuit comprises a video carrier filter, wherein the video carrier filter is arranged to receive the modulated carrier signal as an input and to produce a modulated video carrier signal as an output.

16. The system of claim 15 wherein the code-adding mixer comprises a sideband-stripping filter selectively passing a lower sideband frequency component of the intermediate frequency injection signal produced by the code-adding mixer and not passing an upper sideband frequency component thereof.

17. The system of claim 16 wherein the code-adding mixer further comprises an encoder being arranged to modulate the intermediate frequency injection signal with a digital code, the digital code including a time datum.

18. The system of claim 16 wherein the code-adding mixer further comprises an encoder being arranged to modulate the intermediate frequency injection signal with a digital code, the digital code including time and channel data.

19. The system of claim 16 wherein the RF ancillary signal has an amplitude, wherein the received television program signal has an amplitude, and wherein the output filter comprises an attenuator arranged to match the amplitude of the RF ancillary signal to the amplitude of the received television program signal.

20. The system of claim 7 wherein the coupler comprises a directional coupler.

21. The system of claim 7 wherein the second mixer comprises:

an up converting mixer arranged to mix the local oscillator signal with the intermediate frequency injection signal to produce an ancillary signal; and, an output filter having the ancillary signal as an input and producing as an output the RF ancillary signal at a frequency which is equal to the algebraic difference between a frequency of the local oscillator signal and a frequency of the intermediate frequency injection signal.

22. The system of claim 21 wherein the RF ancillary signal has an amplitude, wherein the received television program signal has an amplitude, and wherein the output filter comprises an attenuator arranged to match the amplitude of the RF ancillary signal to the amplitude of the received television program signal.

23. A method of injecting an RF ancillary signal into a low energy density portion of a channel normally occupied by a color television program signal having a modulated video carrier, a chrominance subcarrier, and the low energy density portion, the method comprising the steps of:

a) tuning the color television program signal so as to produce a local oscillator signal and a modulated carrier signal as outputs;

b) mixing an injection signal at a predetermined injection frequency with a signal representative of the modulated carrier signal to produce an output injection signal;

c) mixing the local oscillator signal with the output injection signal to produce the RF ancillary signal; and, d) coupling the RF ancillary signal into the color television program signal.

24. The method of claim 23 wherein the step of mixing an injection signal comprises the steps of:

reconstructing the modulated carrier signal as an unmodulated, reconstructed video carrier signal; and, mixing an injection signal at a predetermined injection frequency with the unmodulated, reconstructed video carrier signal to produce the output injection signal.

25. The method of claim 24 wherein the reconstructing step comprises the step of filtering the modulated carrier signal to produce a modulated video carrier signal.

26. The method of claim 25 wherein the step of mixing an injection signal at a predetermined injection frequency with the unmodulated, reconstructed video carrier signal comprises the steps of:

passing a lower sideband frequency component of the output injection signal produced by the code-adding mixer; and, blocking an upper sideband frequency component of the output injection signal produced by the code-adding mixer.

27. The method of claim 26 wherein the step of mixing an injection signal at a predetermined injection frequency with the unmodulated, reconstructed video carrier signal comprises the further step of modulating the output injection signal with a digital code, wherein the digital code includes a time datum.

28. The method of claim 26 wherein the step of mixing an injection signal at a predetermined injection frequency with the unmodulated, reconstructed video carrier signal comprises the further step of modulating the output injection signal with a digital code, wherein the digital code includes time and channel data.

29. The method of claim 24 wherein the step of tuning the color television program signal comprises the step of tuning the color television program signal so as to produce a channel-select signal, and wherein the step of mixing the local oscillator signal with the output injection signal comprises the steps of:

mixing the local oscillator signal with the output injection signal to produce an ancillary signal; and, filtering the ancillary signal in response to the channel select signal to produce the RF ancillary signal at a frequency which is equal to the algebraic difference between a frequency of the local oscillator signal and a frequency of the output injection signal.

30. The method of claim 29 wherein the RF ancillary signal has an amplitude, wherein the received color television program signal has an amplitude, and wherein the step of filtering the ancillary signal comprises the step of attenuating the RF ancillary signal so that the amplitude of the RF ancillary signal matches the amplitude of the received color television program signal.

31. The method of claim 29 wherein the reconstructing step comprises the step of filtering the modulated carrier signal to produce a modulated video carrier signal.

32. The method of claim 31 wherein the step of mixing an injection signal at a predetermined injection frequency with the unmodulated, reconstructed video carrier signal comprises the steps of:

passing a lower sideband frequency component of the output injection signal produced by the code-adding mixer; and, blocking an upper sideband frequency component of the output injection signal produced by the code-adding mixer.

33. The method of claim 32 wherein the step of mixing an injection signal at a predetermined injection frequency with the unmodulated, reconstructed video carrier signal comprises the further step of modulating the output injection signal with a digital code, wherein the digital code includes a time datum.

34. The method of claim 32 wherein the step of mixing an injection signal at a predetermined injection frequency with the unmodulated, reconstructed video carrier signal comprises the further step of modulating the output injection signal with a digital code, wherein the digital code includes time and channel data.

35. The method of claim 32 wherein the RF ancillary signal has an amplitude, wherein the received color television program signal has an amplitude, and wherein the step of filtering the ancillary signal comprises the step of attenuating the RF ancillary signal so that the amplitude of the RF ancillary signal matches the amplitude of the received color television program signal.

36. The method of claim 23 wherein the step of mixing the local oscillator signal with the output injection signal comprises the steps of:

mixing the local oscillator signal with the output injection signal to produce an ancillary signal; and, filtering the ancillary signal to produce the RF ancillary signal at a frequency which is equal to the algebraic difference between a frequency of the local oscillator signal and a frequency of the output injection signal.

37. The method of claim 36 wherein the RF ancillary signal has an amplitude, wherein the received color television program signal has an amplitude, and wherein the step of filtering the ancillary signal comprises the step of attenuating the RF ancillary signal so that the amplitude of the RF ancillary signal matches the amplitude of the received color television program signal.

38. A broadcast tuning measurement method in which an RF ancillary channel recognition signal is added to a television program signal received at a predetermined channel frequency within a sampled dwelling unit, wherein the RF ancillary channel recognition signal is subsequently read from the television program signal at a viewing site, the method comprising the steps of:

a) tuning the television program signal so as to produce a local oscillator frequency and a video carrier signal as outputs;

b) providing an injection signal at a predetermined frequency which is selected to be in a low energy density part of a channel;

c) combining the video carrier signal with the injection signal to form a carrier/injection signal;

d) combining the carrier/injection signal with the local oscillator frequency to form the RF ancillary channel recognition signal; and, e) coupling the RF ancillary channel recognition signal into the television program signal.

39. The method of claim 38 wherein the sampled dwelling unit has a plurality of encoding locations and wherein at least steps c)–e) are performed at each of the encoding locations.

40. The method of claim 38 wherein the step of tuning the television program signal comprises the steps of:

tuning the television program signal to produce a modulated carrier signal as an output; and, filtering the modulated carrier signal so as to produce the video carrier signal.

41. The method of claim 40 wherein the step of combining the video carrier signal with the injection signal comprises the steps of:

passing a lower sideband frequency component of the carrier/injection signal; and, blocking an upper sideband frequency component of the carrier/injection signal.

42. The method of claim 41 wherein the step of combining the video carrier signal with the injection signal comprises the further step of modulating the output injection signal with a digital code, wherein the digital code includes a time datum.

43. The method of claim 41 wherein the step of combining the video carrier signal with the injection signal comprises the further step of modulating the output injection signal with a digital code, wherein the digital code includes time and channel data.

44. The method of claim 40 wherein the step of tuning the television program signal comprises the step of tuning the television program signal so as to produce a channel-select signal, and wherein the step of combining the carrier/injection signal with the local oscillator signal comprises the steps of:

combining the carrier/injection signal with the local oscillator signal to produce an ancillary signal; and, filtering the ancillary signal in response to the channel select signal to produce the RF ancillary channel recognition signal at a frequency which is equal to the algebraic difference between a frequency of the local oscillator signal and a frequency of the carrier/injection signal.

45. The method of claim 44 wherein the RF ancillary channel recognition signal has an amplitude, wherein the received television program signal has an amplitude, and wherein the step of filtering the ancillary signal comprises the step of attenuating the RF ancillary channel recognition signal so that the amplitude of the RF ancillary channel recognition signal matches the amplitude of the received television program signal.

46. The method of claim 44 wherein the step of tuning the television program signal comprises the steps of:

tuning the television program signal to produce a modulated carrier signal as an output; and, filtering the modulated carrier signal so as to produce the video carrier signal.

47. The method of claim 46 wherein the step of combining the video carrier signal with the injection signal comprises the steps of:

passing a lower sideband frequency component of the carrier/injection signal; and, blocking an upper sideband frequency component of the carrier/injection signal.

48. The method of claim 47 wherein the step of combining the video carrier signal with the injection signal comprises the further step of modulating the output injection signal with a digital code, wherein the digital code includes a time datum.

49. The method of claim 47 wherein the step of combining the video carrier signal with the injection signal comprises the further step of modulating the output injection signal with a digital code, wherein the digital code includes time and channel data.

50. The method of claim 47 wherein the RF ancillary channel recognition signal has an amplitude, wherein the received television program signal has an amplitude, and wherein the step of filtering the ancillary signal comprises the step of attenuating the RF ancillary channel recognition signal so that the amplitude of the RF ancillary channel recognition signal matches the amplitude of the received television program signal.

51. The method of claim 38 wherein the step of combining the carrier/injection signal with the local oscillator signal comprises the steps of:

combining the carrier/injection signal with the local oscillator signal to produce an ancillary signal; and, filtering the ancillary signal to produce the RF ancillary channel recognition signal at a frequency which is equal to the algebraic difference between a frequency of the local oscillator signal and a frequency of the carrier/injection signal.

52. The method of claim 51 wherein the RF ancillary channel recognition signal has an amplitude, wherein the received television program signal has an amplitude, and wherein the step of filtering the ancillary signal comprises the step of attenuating the RF ancillary channel recognition signal so that the amplitude of the RF ancillary channel recognition signal matches the amplitude of the received television program signal.

* * * * *